United States Patent
Hausmann

(10) Patent No.: US 8,739,356 B2
(45) Date of Patent: Jun. 3, 2014

(54) CLEANING SYSTEM FOR TRANSPARENT TANK

(75) Inventor: Mark Hausmann, Vaudreuil-Dorion (CA)

(73) Assignee: Mark Hausmann, Vaudreuil-Dorion, Quebec (CA)

( * ) Notice: Subject to any disclaimer, the term of this patent is extended or adjusted under 35 U.S.C. 154(b) by 153 days.

(21) Appl. No.: 13/363,379

(22) Filed: Feb. 1, 2012

(65) Prior Publication Data

US 2013/0192641 A1 Aug. 1, 2013

Related U.S. Application Data

(60) Provisional application No. 61/462,101, filed on Jan. 31, 2011.

(51) Int. Cl.
*A47L 5/00* (2006.01)
*A47L 1/09* (2006.01)

(52) U.S. Cl.
USPC .......................... 15/319; 15/246.5; 15/250.24

(58) Field of Classification Search
CPC . A47L 2201/00; A47L 9/009; A47L 2201/04; A47L 9/2805; A47L 9/2857; A47L 9/00; A47L 9/19; A47L 9/02; B02D 21/20; B02D 21/18; B02D 21/245; B02D 21/2433; A01K 61/003; A01K 63/04; A01K 63/045; A01K 63/006
USPC .......... 15/319, 339, 246.5, 250.24, 103, 49.1, 15/50.1, 1.7, 97.1, 220.2; 119/264
See application file for complete search history.

(56) References Cited

U.S. PATENT DOCUMENTS

| | | | |
|---|---|---|---|
| 5,806,463 A | 9/1998 | Rising | |
| 5,988,109 A * | 11/1999 | Rofen | 119/245 |
| 6,206,978 B1 * | 3/2001 | Tsui | 134/8 |
| 6,348,104 B1 * | 2/2002 | Bakker | 134/6 |
| 6,634,052 B2 * | 10/2003 | Hanson | 15/220.2 |
| 6,988,290 B2 * | 1/2006 | Enoch et al. | 15/103 |
| 7,313,840 B2 * | 1/2008 | Watkins | 15/103 |
| 7,506,612 B2 | 3/2009 | Enoch, III et al. | |
| 8,057,606 B2 | 11/2011 | Enoch, II | |
| 2006/0090278 A1 * | 5/2006 | Hang | 15/220.2 |
| 2006/0174840 A1 | 8/2006 | Rafailovich | |
| 2012/0110771 A1 * | 5/2012 | Nakagawa | 15/246.5 |

FOREIGN PATENT DOCUMENTS

WO PCT/EP2000/005870 A1  1/2001

* cited by examiner

*Primary Examiner* — Dung Van Nguyen

(57) ABSTRACT

An automated cleaning system adapted for installation on a tank with transparent walls, with the kit comprising an outer element, an inner element which is adapted for cleaning the inner surfaces of the walls of the tank and which is magnetically coupled to the outer element, a horizontal guide rail, a horizontal drive means that moves a carriage along the guide rail, a vertical drive means fixed to the carriage that drives a shuttle that is fixed to the outer element, and a programmable motion-control system that can controllably move the inner element.

3 Claims, 16 Drawing Sheets

Detail A

CLEANING SYSTEM FOR TRANSPARENT TANK

CROSS-REFERENCE TO RELATED APPLICATIONS

This application claims the benefit of provisional patent application Ser. No. 61/462,101 filed Jan. 31, 2011 by the present inventor.

FEDERALLY SPONSORED RESEARCH

Not Applicable

SEQUENCE LISTING OR PROGRAM

Not applicable

BACKGROUND OF INVENTION

1. Field of the Invention

This invention is in the field of automated systems that clean the walls of tanks.

2. Why this Invention is Needed

Preparing and maintaining artificial aquatic habitats where different kinds of plants and animals live is an engrossing pastime that is enjoyed by large numbers of people in many countries. Those artificial habitats are established in a tank with one or more transparent walls that are made of either glass or acrylic plastic. The aim is to give people the pleasure of observing the growth, movements and interactions of freshwater or marine animal species that often live amongst a variety of plant life that contributes to an approximation of a natural ecosystem.

The maintenance of such an aquatic habitat, whether it is large or small, is time-consuming. One of the obvious tasks is to keep the transparent walls of the tank clear of any algae or other growth that, if not controlled, will soon block the observer's view, thereby defeating the purpose of such a project. It will be especially difficult to keep such growth under control if the aquarium owner is absent for an extended period of time, leading to neglect of what must be a regularly scheduled cleaning process. What is needed, therefore, is a practical, fully automated system that will keep the tank's walls clean. To be widely accepted, it must be easy to install on different tank designs that are in common use. It must be easy to set up and configure, flexible in its operation, safe to use and reliable, and resistant to damage. As well, to gain acceptance it must be affordable for a significant number of aquatic habitat enthusiasts. The goal of the present invention is to fully respond to those needs.

3. Prior Art and its Limitations

Manually-Operated, Magnetically-Coupled Brushes

Many different kinds of cleaning implements, a few with motorized brushes or scrapers, have been developed to enable the person maintaining the aquarium to manually remove algal growth from the walls. Among them are magnetically-coupled, "inside-outside" paired elements that enable the user to move the outside element along the outer surface of an aquarium wall to cause a corresponding movement of the coupled cleaning device along the inner surface on the adjacent side of the wall, thereby removing the algal growth. By using such a magnetically-coupled device, the person who is doing the cleaning avoids having to introduce a cleaning device with a long handle into the aquarium where it may easily disturb the plant and animal life. Moreover, it is much easier to observe the efficacy of the cleaning action when those doing the work can readily observe the effect of their efforts. Although with proper effort such devices can do the job well, not everyone has the time and patience to do this work as regularly as is required to allow for the uninterrupted pleasure of viewing the aquatic life through transparent walls.

A few examples of the prior art in the field of manually-controlled devices of that kind are: U.S. Pat. No. 6,634,052 issued on Oct. 21, 2003 to Hanson that features interchangeable cleaning elements. Some devices, such as U.S. Pat Application US 2010/0083983 to Linden, teach ways to choose between two kinds of cleaning element on the inner element while the two elements are coupled, by having the user act upon a control element on the outer element.

Some manually-operated cleaning devices are adapted to allow the inner element to be transferred from one tank wall to another when the outer element is moved to the second wall. An example is U.S. Pat. No. 6,206,978 issued on Mar. 27, 2001 to Tsui. That design is designed for use in tanks that have rounded corners, such as some models of tanks with acrylic walls. Another example of prior art designed for this purpose is U.S. Pat. No. 7,506,612 issued to Enoch et al. on Mar. 24, 2009.

Limitations of Previous Attempts to Develop an Automated Cleaning System for Tanks Rafailovich, in U.S. Patent Application 20060174840, proposed a system with magnetically-coupled inner and outer elements wherein a drive system is integrated into the outside element. One significant limitation of this system is its inability to automatically move from one wall of the aquarium to another. A comparable system in terms of its operating principles, one of several that have been designed to clean windows in buildings, is described in Int. Application PCT/EP2000/005870 filed by Schlosser. Prior art designs related to window-cleaning, however, do not have to transfer such devices around a corner from one surface to another, which is a necessary feature for a system that will be used in tanks with multiple viewing surfaces.

A system proposed by Schneider in German Pat. Application DE 10 2008 027 describes a system designed to clean the inner surface of a tank that has a single wall of cylindrical curvature, with that cylinder having a vertical axis. Such tanks may include large aquarium visited by the public. Schneider's design shows a horizontal rail that extends three-quarters of the way around the tank. A moving cleaning element travels back and forth along that rail. The rail must be very substantial in construction, as it is only supported at its ends. The rail is raised and lowered to enable the moving element to clean different long, narrow horizontal swaths of wall surface. The cleaning method taught by Schneider is not adapted for use in a tank that has walls that meet at a corner. Moreover, in order to create a discontinuous cleaning path that would avoid obstacles at certain points, the large rail would have to be moved up and down making such a maneuver slow, and requiring a powerful drive system.

U.S. Pat. No. 5,806,463 issued to Rising on Sep. 15, 1998 teaches a specially modified aquarium that includes a cleaning system that is best adapted to clean his "aquarium tank that is particularly enclosed in a wall recess such that there is a single viewing surface". Rising's design does not use magnetically-coupled elements, as all elements of the system are located within the tank. This design only provides for horizontal movement of the full-height cleaning element. Rising explains that his invention can only properly clean a tank with multiple viewing surfaces if the tank corners are significantly rounded. However, the simplistic figure that shows how his system would go around a corner contradicts his more detailed drawings. Those figures teach a system that can only be used on a single viewing surface. Rising proposes that areas in a "square tank" that cannot be cleaned—areas near the corners—should be concealed by "side corner moldings". We will discuss below additional limitations of this design in comparison with our invention, in the section of this application entitled "Specific competitive advantages of this invention".

Summary of the Need for Improved Technology

An examination of the prior art therefore reveals a need for an unattended, automated cleaning system that can easily be retrofitted to existing aquariums. Such a system should be able to clean the inner surfaces of the walls of tanks which have with either curved walls or planar walls, with those walls meeting at rounded or angular corners, with the entire wall being thoroughly cleaned, including areas adjacent to the corners. There is a further need for such a tank cleaning system to be able to avoid obstacles such as snails that may attach themselves to the walls. The mechanical components of the system should be outside the tank to avoid water, or the attachment of life forms and the growth of algae on the components, and possible contamination of the tank contents. Given the many differences that exist between one aquatic habitat and another, there is a need for a system that provides for cleaning operations that can be easily specified by the user, in terms of cleaning pattern and schedule, to adapt the system to the user's specific needs.

Objects and Advantages

The present invention answers the need for a practical and effective, fully automated aquarium wall cleaning system that overcomes the limitations of previous designs. The objects of this invention therefore include that the system:

a) can be sold as an after-market kit that can be fitted to a large proportion of the aquarium designs that are now in use;

b) can, in one continuous process, automatically clean both surfaces of the four walls of the most common kind of aquarium, with the quality of the work done being high enough to satisfy the most demanding consumer;

c) can move the cleaning element that is applied to the surface of the inner wall in any direction, including horizontal sweeps, vertical sweeps, diagonal sweeps, or even curved sweeps, and in repeated fashion, thereby ensuring thorough cleaning of the most difficult areas;

d) can be programmed, under microprocessor control, to do the required cleaning at the preferred time of day and at the preferred frequency of cleanings per week. It can also be programmed to clean specific areas more thoroughly or more often—areas where lighting conditions or sand promote more vigorous algal growth;

e) can be programmed to move around fixed obstacles such as filtration systems that are inside the aquarium adjacent to a wall;

f) can detect and avoid obstacles such as snails that will be constantly changing their positions on the inner surfaces of the aquarium walls; and g) will provide for safe operation by incorporating sensors that enable the control system to shut the system down if something interferes with system's normal operation, whether that is an obstacle on or near the aquarium's walls, or a pet or child that blocks normal movement of the mechanism or even touches it.

SUMMARY

In accordance with the present invention, a cleaning system adapted to clean the surfaces of the walls of a tank comprises: an outer element that is driven controllably along the outer surfaces of the tank walls; an inner element that is magnetically coupled to the outer element and which presses a cleaning implement against the inner surface of the walls; a mechanism that decouples the two elements when a first wall has been cleaned, transfers the outer element from that wall to a second wall, and permits the two elements to be magnetically recoupled so that the second wall can be cleaned; a programmable control system that provides for object avoidance and configuration by the user of a preferred cleaning process and schedule; safety features that prevent injury to the user and damage to the system.

DRAWINGS—FIGURES

In the drawings, closely related figures have the same number but different suffixes.

Figure 1:
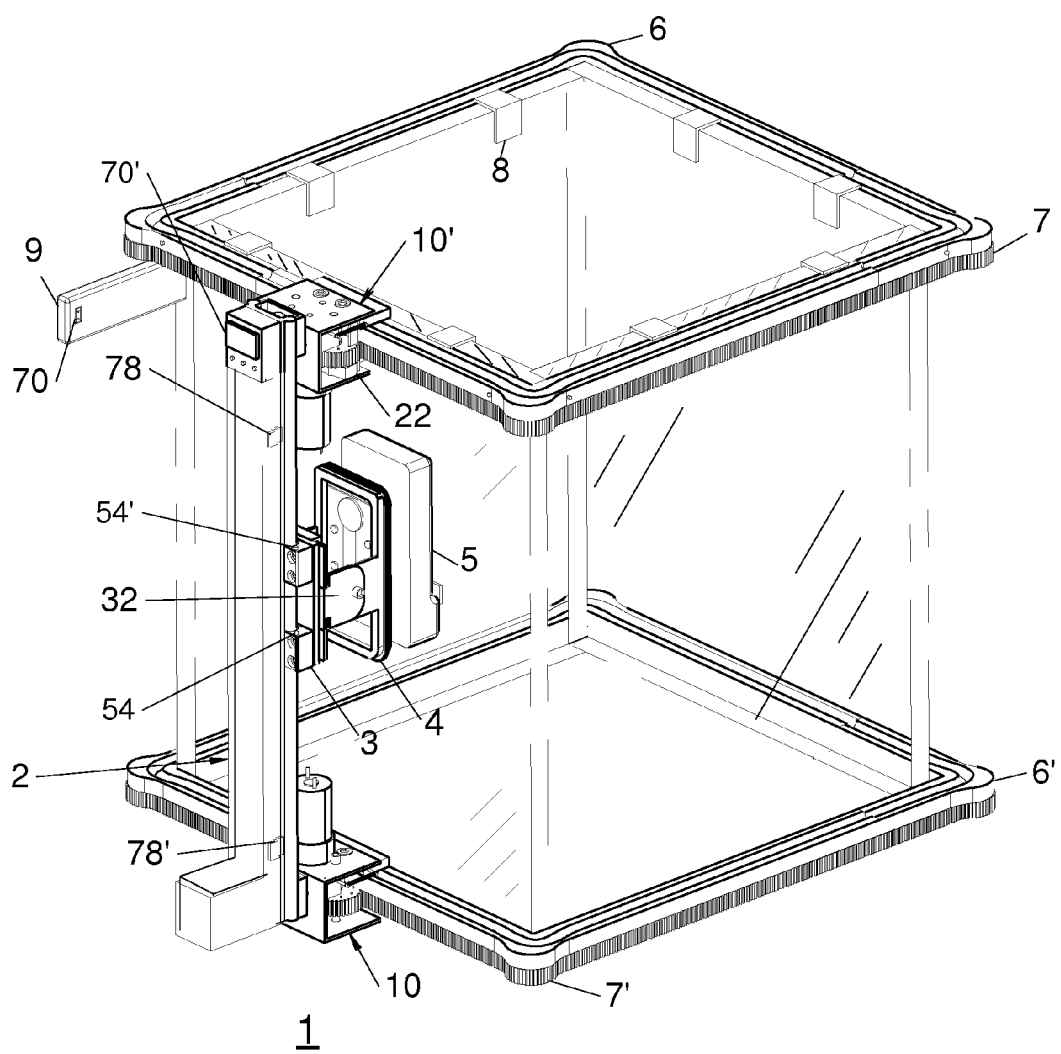
FIG. 1 is a pictorial view that shows how a first preferred embodiment of the invention is installed on a typical aquarium.

FIGS. 13a, 13b, 13c, and 13d are schematic diagrams of the elements that comprise the various control means of this invention.

| DRAWINGS - REFERENCE NUMERALS | |
|---|---|
| 1. | tank-cleaning system |
| 2. | carriage |
| 3. | shuttle |
| 4. | outer element |

-continued

| DRAWINGS - REFERENCE NUMERALS | |
|---|---|
| 5. | inner element |
| 6. | guide rail |
| 7. | geared track |
| 8. | rail mounting bracket |
| 9. | battery recharging station |
| 10. | carriage drive mechanism |
| 11. | dual-rail vertical guide |
| 12. | linear-motion belt |
| 13. | pulley |
| 14. | shuttle drive motor |
| 15. | frame |
| 16. | follower mounting plate |
| 17. | groove follower |
| 18. | spring |
| 19. | carriage drive motor |
| 20. | carriage drive powered gear |
| 21. | carriage drive driven gear |
| 22. | carriage-to-track retainer |
| 26. | releasable retainer |
| 27. | pillow block |
| 28. | coupling magnet |
| 29. | ferromagnetic plate |
| 32. | outer-element holder |
| 35. | buoyancy-adjusting weights |
| 36. | cleaning-element mounting plate |
| 37. | sand foot |
| 38. | lead screw |
| 39. | pivot bolt |
| 40. | shuttle-drive powered gear |
| 41. | shuttle-drive driven gear |
| 42. | gear cover |
| 43. | guide rail straight section |
| 44. | guide rail corner section |
| 45. | guide rail groove |
| 46. | corner marking magnet |
| 47. | microcontroller |
| 48. | user interface |
| 50. | retainer mounting bolts |
| 51. | horizontal drive means |
| 52. | vertical drive means |
| 53. | horizontal-travel limit marker magnet |
| 54. | vertical-travel position marker magnet |
| 56. | horizontal-travel sensor |
| 57. | inner-element position-marking magnet |
| 58. | corner sensor |
| 59. | motor-shaft angular position sensor |
| 60. | carriage-pivot angular position sensor |
| 61. | touch-detection capacitance sensor |
| 62. | obstacle-detection contact sensor |
| 63. | battery-voltage sensor |
| 66. | WiFi processor w/sensor inputs |
| 67. | WiFI processor w/PC interface |
| 68. | motor driver |
| 69. | USB PC interface |
| 70. | battery-charge contacts "A" |
| 71. | battery-charge contacts "B" |
| 73. | connector to power supply cable |
| 74. | microcontroller |
| 75. | control system |
| 76. | programmable motion-control means |
| 77. | lead screw follower |
| 78. | vertical travel sensor |
| 79. | inner-element-displacement sensor |
| 80. | power supply |
| 81. | shuttle battery |
| 82. | carriage battery |
| 84. | cleaning process command and control |
| 85. | tank exploration algorithms |
| 86. | definitions of selected areas |
| 87. | definitions of cleaning process routines |
| 88. | object-avoidance algorithms |
| 89. | user software interface |
| 90. | cleaning schedule executive control |
| 91. | corner-maneuver algorithms |
| 92. | cleaning area specification |
| 94. | cleaning routine selection |
| 95. | new cleaning routine definition |

-continued

| DRAWINGS - REFERENCE NUMERALS | |
|---|---|
| 96. | cleaning routine modification |
| 97. | cleaning scheduling |

DETAILED DESCRIPTION

FIGS. 1 through 7 and 11 through 13

First Preferred Embodiment

One of two preferred embodiments of the tank cleaning system of the present invention is illustrated in Figs tank-cleaning system 1 through 5. This embodiment employs two guide rails that go completely around the tank, one positioned along the top edge and the other along the bottom. Although this embodiment is considerably more complex and costly than the second preferred embodiment which has a single guide rail along the top edge, a two-rail system makes possible very efficient cleaning around obstacles that are located on, or proximate to, the inner walls of the tank. The single rail version can do the same, but more slowly and with some limitations.

FIG. 1

FIG. 1 (pictorial view) shows how a tank-cleaning system 1, which is typically provided as a consumer-installed kit, is installed on a common form of aquarium. A carriage 2 is movably attached to an upper guide rail 6 and a lower guide rail 6' which are fixed to the aquarium by means of a sufficient quantity of a rail mounting bracket 8 to secure the upper rail 6 to the top edge of the aquarium walls, and, in the case of the lower rail 6', by dual-faced adhesive tape, or by other suitable means, along the bottom of the aquarium's walls. Guide rails 6 and 6' incorporate a geared track 7 in the upper rail and a geared track 7' in the lower rail which are followed by a controllably-driven pair of gears in each one of an upper and a lower carriage drive mechanism 10 and 10'. When carriage 2 is in a parked position adjacent a battery recharging station 9, a matching pair of battery recharging contacts 70 on battery recharging station 9 and another pair 70' on carriage 2 provide for recharging of a battery 82 carried in carriage 2 and a battery 81 in a shuttle 3, which, in that parked position, is connected to the electrical power provided by battery recharging station 9 via a pair of electrical contacts 71 on carriage 2 that connect with a matching pair of contacts 71' on shuttle 3, via electrical conductors (not shown) that pass through carriage 2.

An outer-element holder 32 is removably attached to shuttle 3 and is pivotably attached to an outer element 4. An inner element 5 is magnetically coupled to outer element 4, such that outer element 4 is pressed against an the surface of an aquarium wall, and inner element 5 is pressed against that wall's inner surface opposite outer element 4.

FIG. 2

Figure 2:
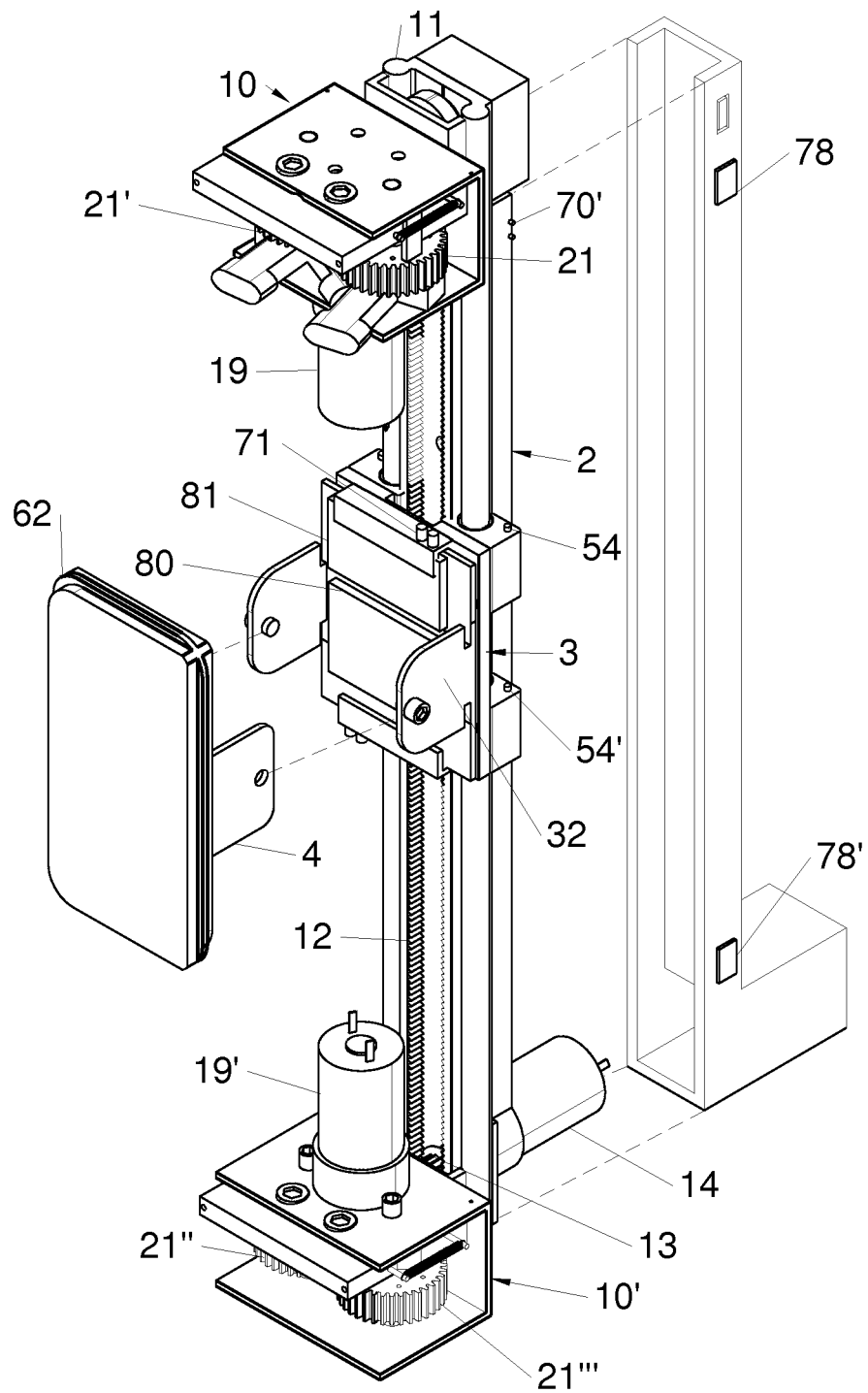
FIG. 2 is a partially exploded pictorial view that shows the assembly of the principal elements of the first preferred embodiment, elements that move together around the aquarium.

The components of carriage 2 are further illustrated in FIG. 2 (partially exploded pictorial view). Shuttle 3 is attached to a linear-motion belt 12 which is driven by a pulley 13 which is fixed to the shaft of a shuttle drive motor 14. The movement of shuttle 3 is constrained to a vertical path by a dual-rail vertical guide 11 to which it is slidingly attached by a set of four pillow blocks 27 (not shown in this view). When shuttle 3 reaches the top of its vertical travel path, sensor 78 detects position marker magnet 54 and causes a signal to be sent to microcontroller 74. At the bottom of its vertical path, sensor 78' detects marker 54'.

An upper and lower carriage drive mechanism 10 and 10' each comprise a carriage drive motor 19 and 19' that drive a powered gear 20 and 20' (not shown in FIG. 2) which are fixed to the motor shaft. Gears 20 and 20' are pinion gears which drive a pair of driven gears 21 and 21' in the upper drive mechanism 10, as well as 21" and 21'" in the lower bottom drive mechanism 10', all in the same rotational direction. When carriage 2 is mounted on guide rail 6, driven gears 21 engage with geared tracks 7 and 7' to controllably move carriage 2 horizontally around the aquarium.

Outer element 4 is shown detached from an outer element holder 32 to which it is normally loosely bolted (bolts not shown).

FIG. 3

Figure 3:
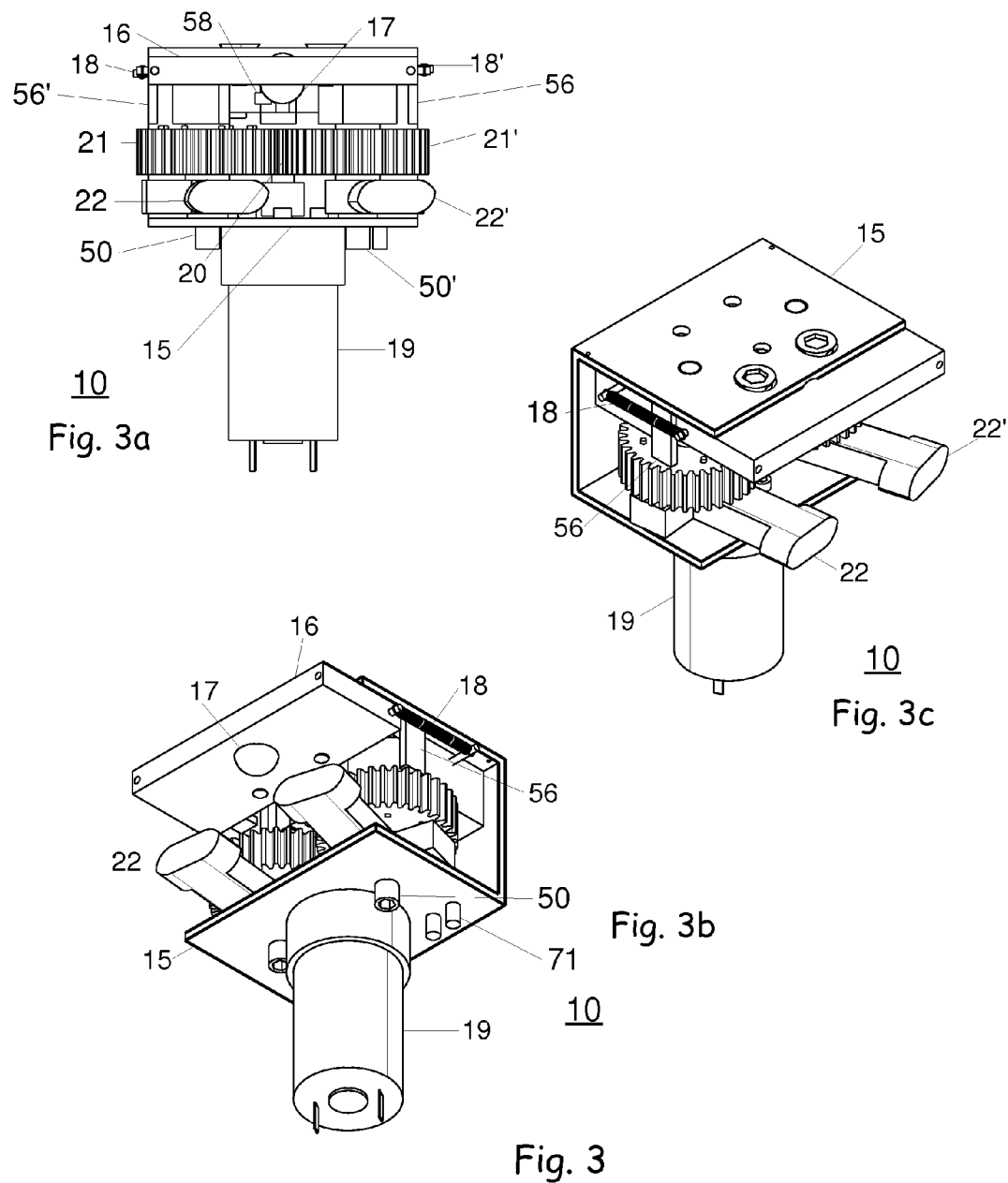
FIGS. 3a, 3b and 3c are different pictorial views of the upper drives system that provides for horizontal movement of the carriage that attaches to guide rails that are fixed to the aquarium.

Further details of carriage drive mechanism 10 are illustrated in FIGS. 3a, 3b and 3c. A carriage drive motor 19 is mounted to frame 15. A carriage drive powered gear 20, which is fixed to the shaft of carriage drive motor 19, drives carriage-drive driven gears 21 and 21' which engage with the teeth of geared track 7 when carriage 2 is mounted on guide rail 6. A pair of carriage-to-rail retainers 22 and 22' are each pivotably mounted by means of a retainer mounting bolt 50 and 50'. The bottom half of a spherically-shaped groove follower 17, which is made from a low-friction polymer resin, slides along a guide rail groove 45 that runs the length of guide rail 6 (not shown in FIG. 3). Groove follower 17 is fixed in a follower mounting plate 16 which is attached to a pair of springs 18 and 18', with the other end of spring 18 being attached to drive mechanism 10 by means of a pin fixed in a drive frame 15. The tension of spring 18 pulls drive mechanism 10 towards guide rail 6, thereby ensuring adequate engaging pressure between carriage-drive driven gear 21 and geared track 7.

Carriage drive mechanism 10 incorporates a corner magnet sensor 58 which causes a signal to be received by a microcontroller 74 when corner magnet sensor 58 is proximate to a corner-marking magnet 46 in guide rail 6 (not shown in FIG. 3). Carriage drive mechanism 10 incorporates a pair of end-of-track magnet sensors 56 and 56' which cause a second signal to be received by microcontroller 74 when carriage drive mechanism 10, as it travels along guide rail 6, reaches either end of the horizontal path traveled by carriage drive mechanism 10, with each end being marked by a horizontal-travel-limit marking magnet 53 (not shown on FIG. 3).

FIG. 4

Figure 4:
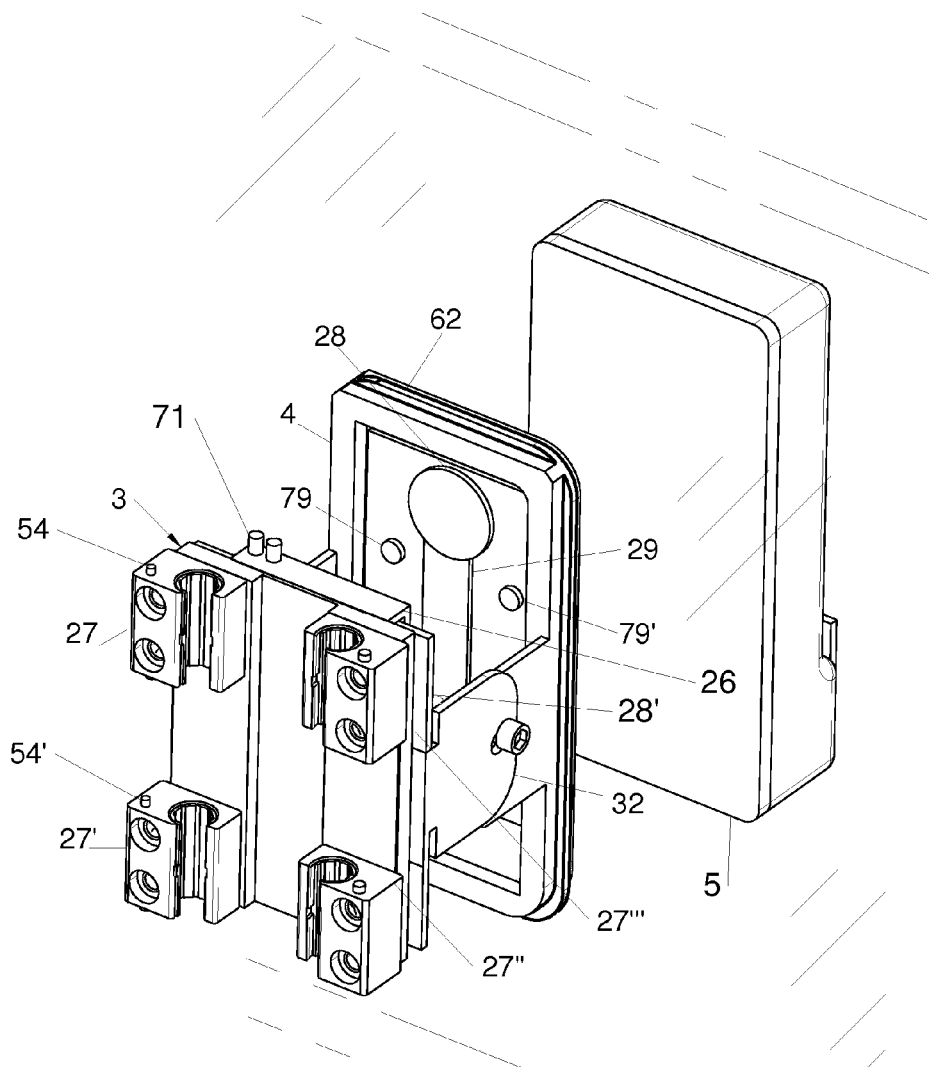
FIG. 4 is a pictorial view that shows the shuttle that together with the other parts that are removably attached to it.

Further details of shuttle 3 and the elements that are thereto attached are illustrated in FIG. 4. Shuttle 3 is slidingly attached to a dual-rail vertical guide 11 (not shown in FIG. 4) by a set of four pillow blocks 27 which are integral to shuttle 3 on the side that faces carriage 2. Shuttle 3 incorporates a releasable retainer 26 which releasably retains outer-element holder 32. Outer-element holder 32 is pivotably attached to outer element 4 in such a way that there is sufficient horizontal play between outer-element holder 32 and outer element 4 to allow outer element 4 to remain in contact with the wall of the aquarium, despite slight variations in the distance between carriage 2 and the aquarium wall. The loose horizontal coupling between outer element 4 and holder 32 ensures that the only force applied to outer element 4 by holder 32 is along the face of the aquarium wall.

To permit outer element 4 to attach magnetically through the aquarium wall to inner element 5, outer element 4, as implemented in the illustrated embodiment, incorporates a pair of coupling magnet 28 and 28' that are connected by a ferromagnetic plate 29, wherein the two coupling magnets 28 and 28' present opposite magnetic polarities to the aquarium wall. The coupling magnets 28 are attracted to similar magnets of opposite polarity that are integral to inner element 5.

Outer element 4 also incorporates a set of four inner-element-displacement sensors 79 which can detect variations in the magnetic fields that are associated with a set of four permanent magnets 57 that are incorporated into inner element 5 (not shown in FIG. 4). If inner element 5 moves freely on the inner wall of the aquarium, the position of inner element 5 relative to outer element 4 will be stable. If, however, inner element 5 makes contact with an obstacle while outer element 4 is moving, the relative position between outer element 4 and magnetically-coupled inner element 5 will change slightly from the stable position. Such a change will result in position sensors 79 causing a third signal to be received by microcontroller 74. In such an event, microcontroller 74 will control shuttle drive motor 14 and carriage drive motor 19 in such a way that inner element 5 will avoid that obstacle.

Outer element 4 further incorporates obstacle-detection contact sensor 62 which is in the form of a bi-directional flexible bend sensor that is fitted around the periphery of outer element 4. The component chosen for use in this embodiment is Images Scientific Instruments part no. FLX-01-L obtainable from www.robotshop.com. If an edge of outer element 4 comes in contact with any obstacle that is fixed to the outside of the aquarium wall, such as a magnet that is used to retain a pump, filter, thermometer, or other accessory that is disposed on the inside of the aquarium, obstacle sensor 62 will cause a fourth signal to be received by microcontroller 74 which will instantaneously control shuttle drive motor 14 and carriage drive motor 19 in such a way that the movement of outer element 4 will be appropriately modified.

FIG. 5

Figure 5:
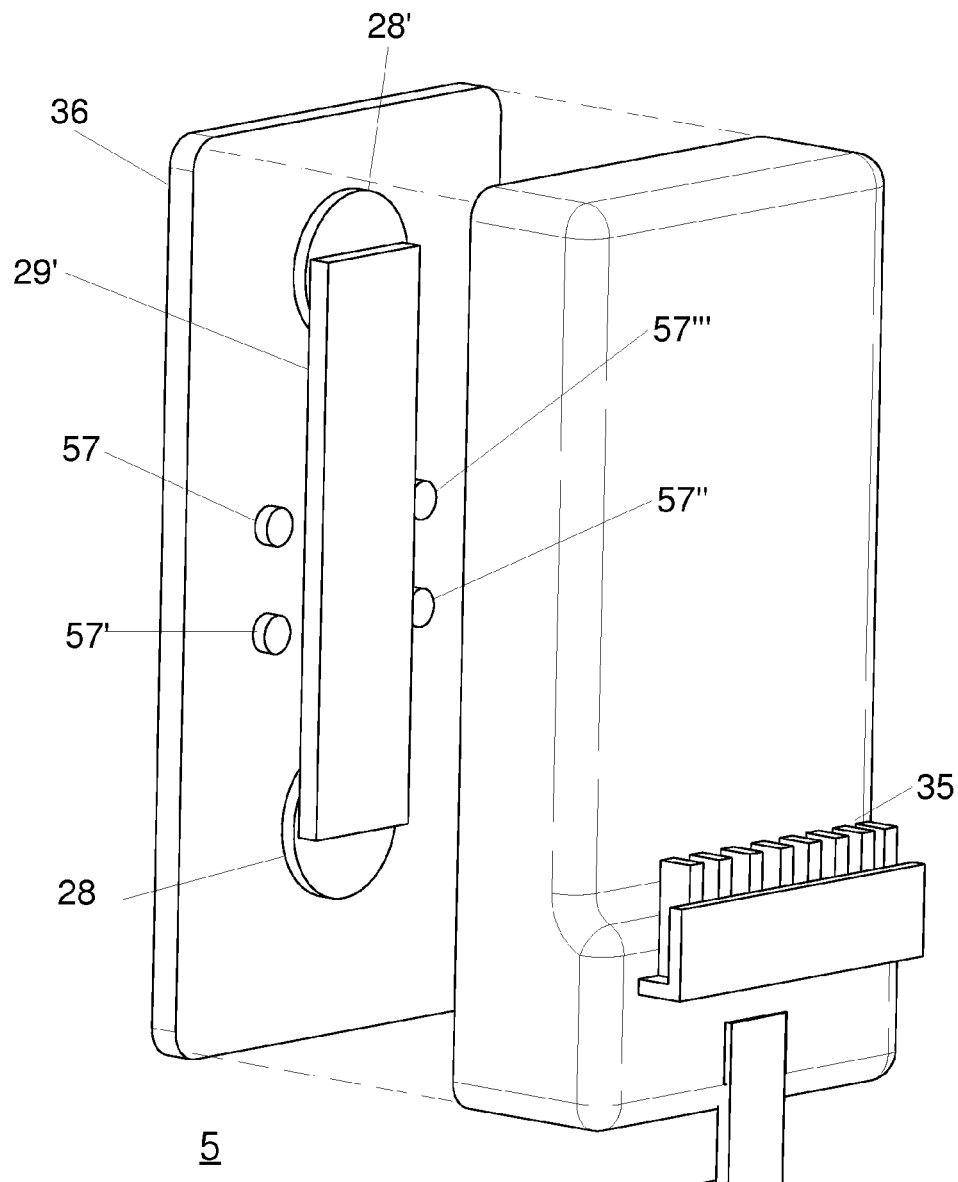
FIG. 5 is a partially exploded pictorial view of the inner element.

FIG. 5 illustrates the elements of inner element 5. A cleaning element mounting plate 36 comprises, on one side, a planar cleaning element (not shown) attached to the surface of cleaning element mounting plate 36 that is pressed against the inner surface of the aquarium. On the other side of cleaning element mounting plate 36 are a pair of coupling magnets 28 and 28' connected by a ferromagnetic plate 29', with the polarities of coupling magnets 28 and 28' being opposite those of the corresponding elements, coupling magnets 28 and 28', that are integral to outer element 4. Inner element 5 also carries a set of four position-marking magnets 57 that are located in positions that match the positions of sensors 79 on outer element 4. The magnetic fields associated with position marking magnets 57 thereby serve to establish the position of inner element 5 in relation to outer element 4, as any changes in the position of position marking magnets 57 will be detected by position sensors 79.

Also shown in FIG. 5 are a plurality of buoyancy-adjusting weights 35 that serve to make possible an adjustment of the buoyancy of inner element 5. Sand foot 37 is a downward-facing appendage to inner element 5 which serves to cause element 5 to be displaced from its stable position in relation to outer element 4 if sand foot 37 makes contact with the sand at the bottom of the aquarium. That displacement is sensed by sensors 79 on outer element 4 which causes a signal to be sent to microcontroller 74, which will cause a reversal of the vertical travel of inner element 4, thereby moving element 5 away from the sand. The distance that sand foot 37 extends from element 5 can be adjusted.

FIG. 6

Figures 6, 6A:
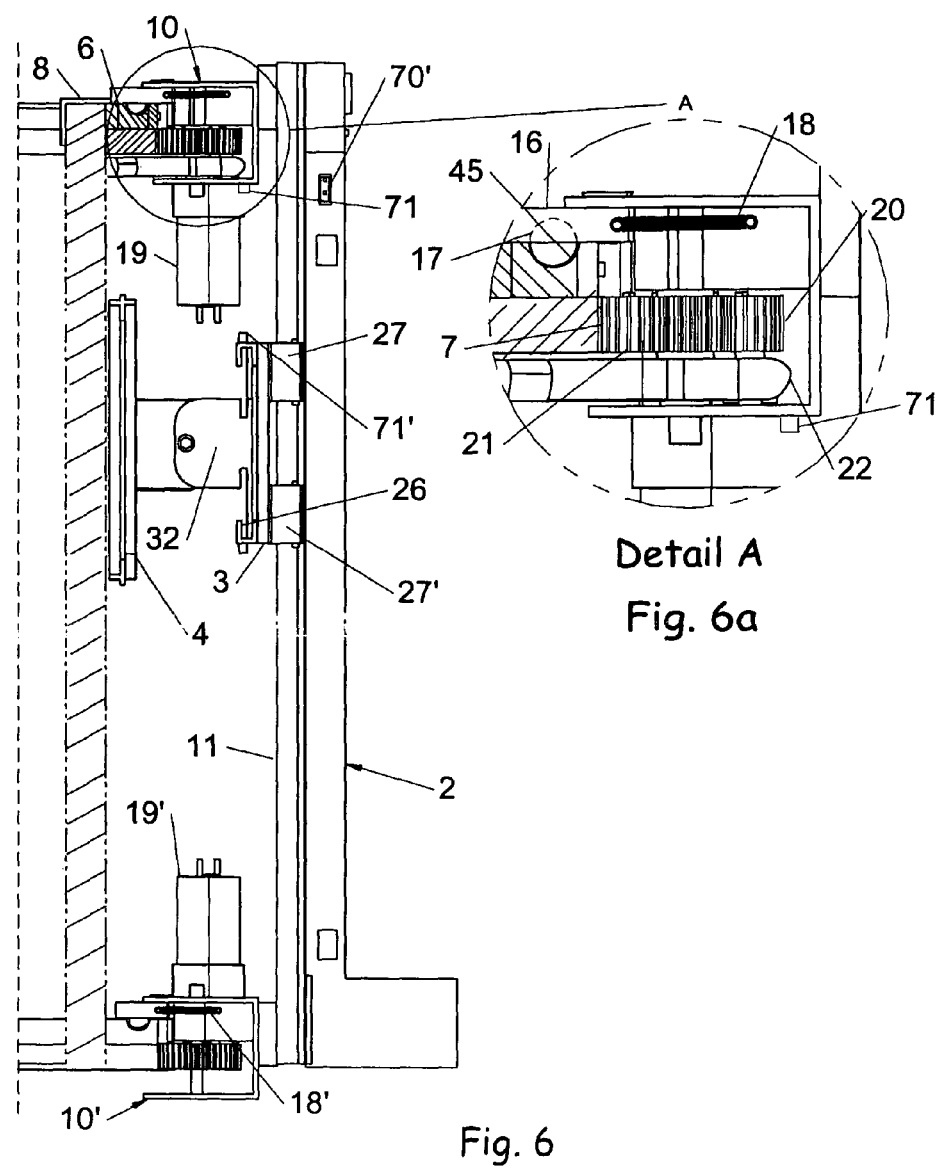
FIG. 6 is a side elevation view that shows how the principal moving elements of the inventions attach to the guide rails that are fixed to the aquarium, with an enlarged detail view.

FIG. 6 is an elevation view with some parts shown in cross section that shows carriage 2 positioned against the aquarium, with a sectional view illustrating in detail how carriage drive mechanism 10 attaches to guide rail 6 by engaging with a guide rail groove 45 and geared track 7.

Upper and lower guide rail 6 are shown in FIG. 6 attached to the top and bottom of the aquarium wall respectively by rail mounting bracket 8 (only one bracket 8 shown in cross section view), and by an adhesive (not shown). Outer element 4 is positioned against the aquarium wall which is shown in cross-section. Inner element 5 is not shown. Outer-element holder 32, which is pivotably attached to outer element 4, is shown removably attached to shuttle 3 by means of releasable retainer 26 that allows outer element 4 to be slid into position.

Figure 7:
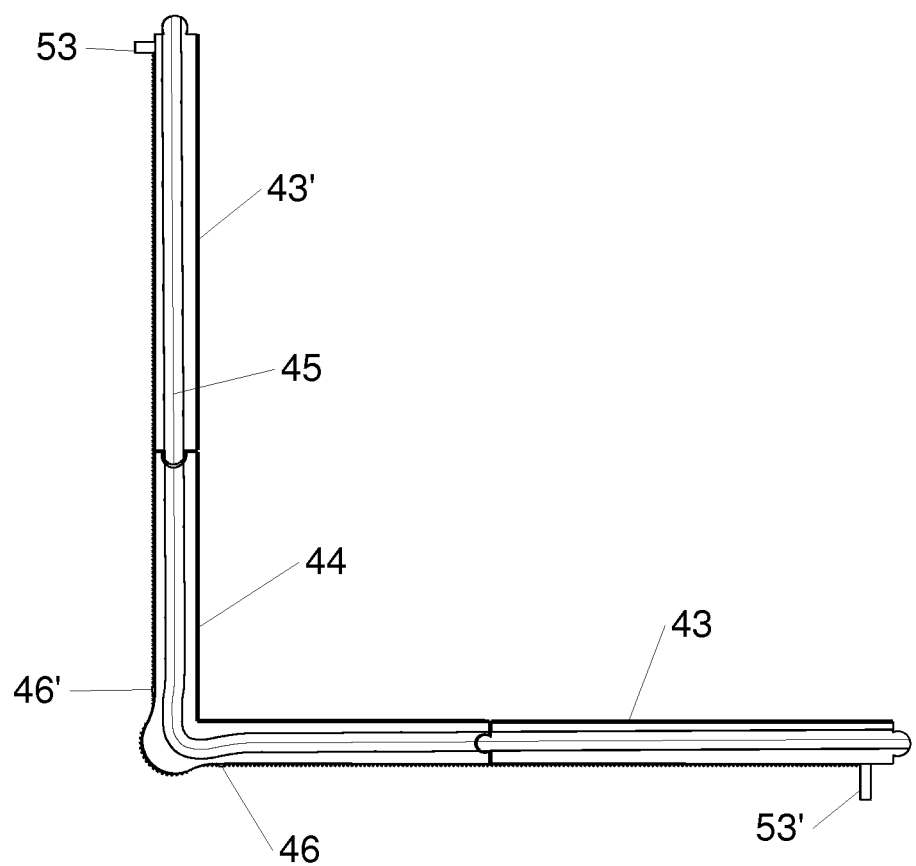
FIG. 7 is a plan view that shows the modular construction of a guide rail, illustrating the special curve of the longitudinal groove in the rail's corner section.

Detail "A" is shows how groove follower 17 is disposed in guide rail groove 45 which runs along guide rail 6, wherein rail 6 is shown in cross section. Groove follower 17 is held in a follower mounting plate 16. Follower mounting plate 16 is connected on each side by spring 18 (not shown) and 18' to frame 15. Because groove follower 17 is constrained by guide rail groove 45, springs 18 and 18' pull carriage-drive driven gear 21 (not shown) and 21', which are mounted in frame 15, against geared track 7. This ensures precisely controlled linear motion of carriage 2, despite small variations in the planarity of the aquarium wall. Follower mounting plate 16 sits on the upper surface of guide rail 6 and slides along it when carriage 2 moves.
FIG. 7

FIG. 7 is a plan view that illustrates the modular construction of guide rail 6. A typical installation will employ four pieces of a guide rail corner section 44 and at least four pieces of a guide rail straight section 43.

Of special importance are the particular geometrical curves that geared track 7 and guide rail groove 45 assume in guide rail corner section 44. Microcontroller 74 is advised that carriage 2 is approaching a corner by corner-marking magnets 46 set in rail 6. The different double-ogee curves of geared track 7 and guide rail groove 45 enable carriage 2 to move from one wall around the corner to a second wall, while effecting the decoupling of inner element 5 from outer element 4 at the beginning of the path that moves around the corner. Inner element 5 will recouple to outer element 4 after carriage 2 has traveled around the corner. The curve of geared track 7 takes into account the use of two carriage-drive driven gears 21 in each of the upper and lower drive mechanism 10, with those gears 21 traveling along geared track 7. At the mid-point of carriage 2's travel around the corner, the curve of geared track 7 enters between gears 20. The special curve of geared track 7 has been designed to ensure that good contact is maintained between gears 21 and the upper and lower tracks while the distance of carriage 2 from the aquarium is controlled by the travel of groove traveler 17 in guide rail groove 45.

Figure 11:
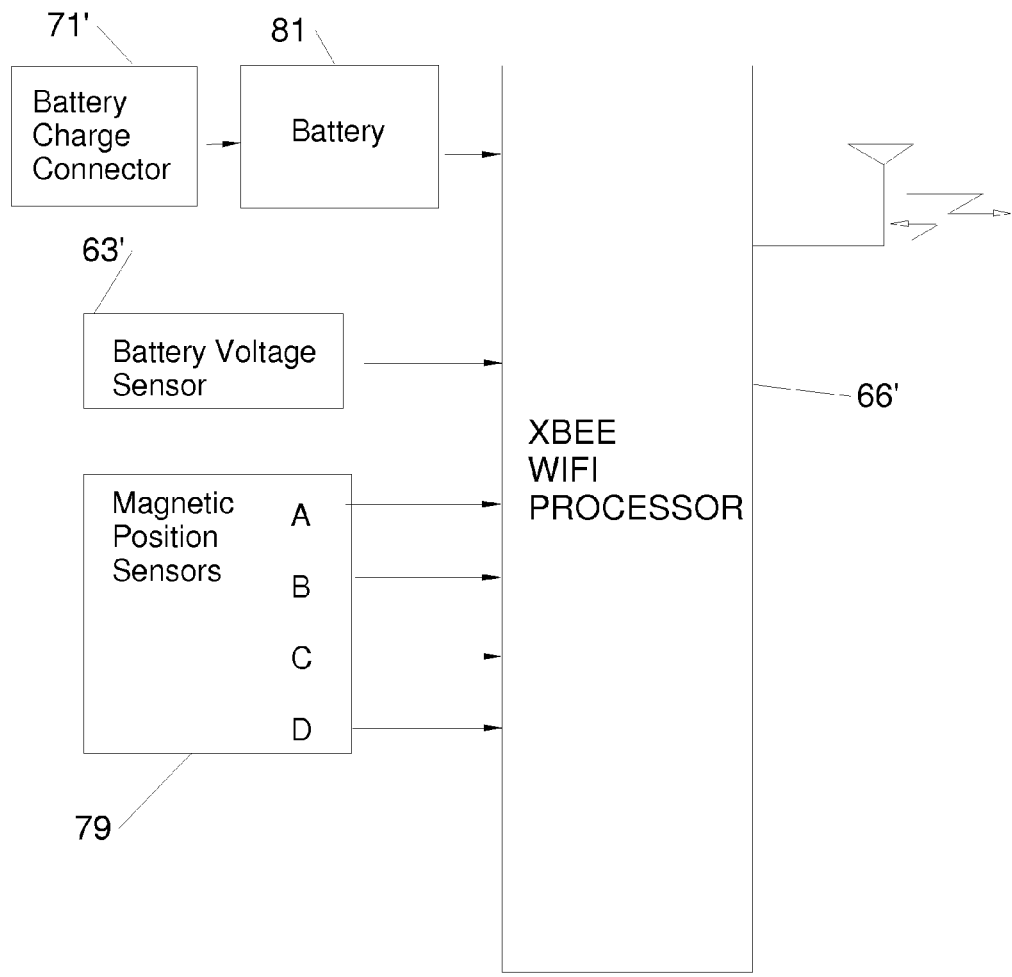
FIG. 11 is a schematic diagram of the electronic and electrical power components that are carried by the shuttle.
Figure 12:
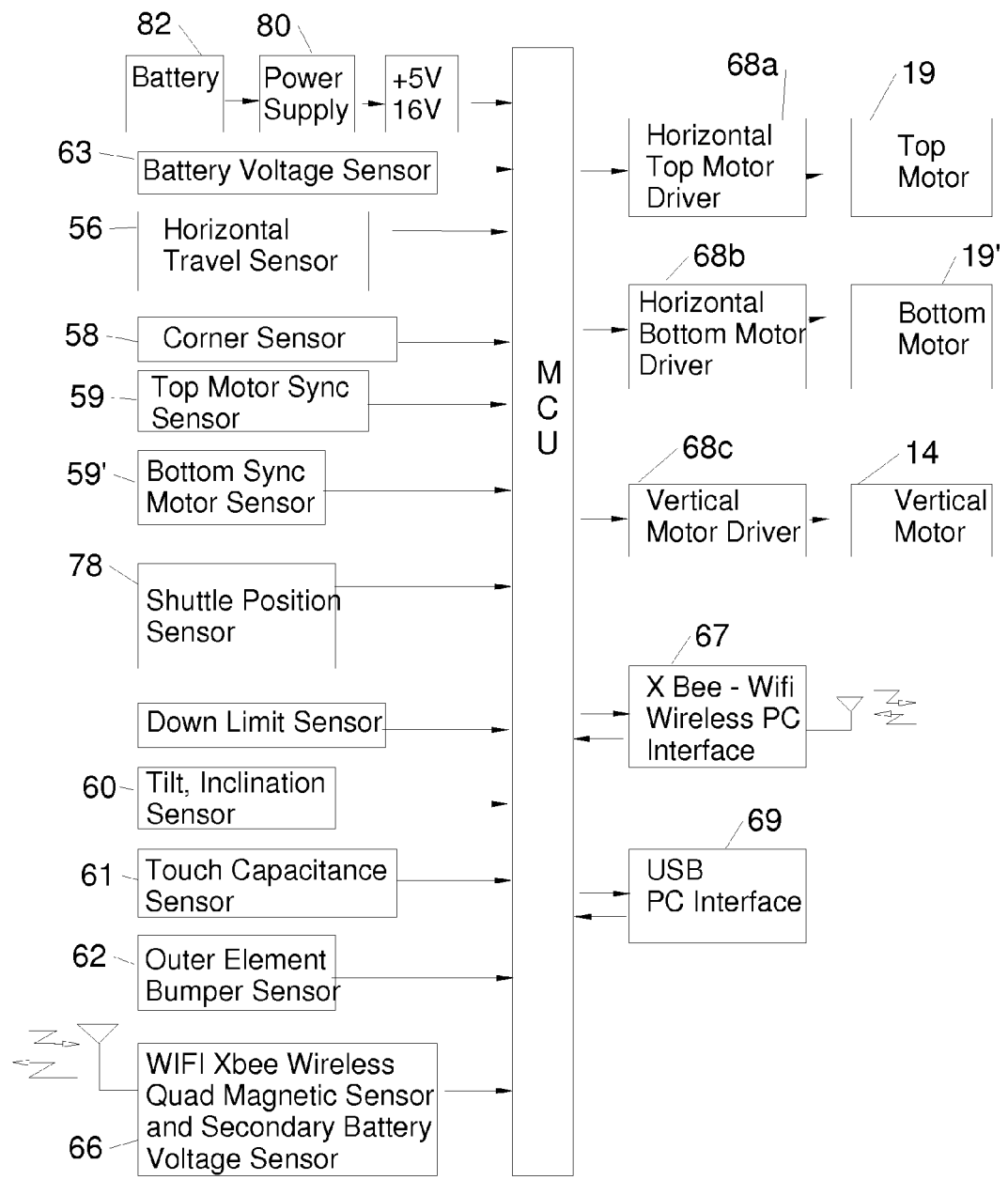
FIG. 12 is a schematic diagram of the electronic and electrical power components that are carried by the carriage.

Rail 6 is fitted with travel-limit marker magnets 53 and 53' at the two ends of the path that carriage 2 will travel. One end is adjacent battery recharging station 9. When magnet 53' is detected by horizontal-travel sensor 56 which is on carriage 2, the carriage 6 will be controllably moved until its battery-charging contacts 70 are in contact with matching contacts 71' on station 9.
FIGS. 11 and 12

FIG. 11 shows the electrical and electronic components carried on outer element 4. They include four Hall effect sensors 79 that react to any change in position of the position marking magnets 57 which are carried on inner element 5. A battery voltage sensor 63' detects a too-low voltage condition on a battery 81 which is recharged via a pair of contacts 71'. The signals from the sensors are processed by a WiFi processor 66' which, if an error condition is detected, will use wireless data communications to communicate with a similar processor carried by carriage 4.

FIG. 12 shows the electrical and electronic components carried on carriage 2. Battery 82, via power supply 80, feeds power to microcontroller 74. The following sensors provide signals to MCU 74: a battery voltage sensor 63; horizontal travel sensor 56; corner sensor 58; a pair of motor sync sensors 59 and 59'; shuttle position sensors 78 ad 78'; tilt sensor 60, which is used on the second preferred embodiment; a touch capacitance sensor 61; and outer element bumper sensor 62.

A WiFi module 66 receives sensor signals which have been captured by an identical module, 66', which, on shuttle 3, serves both as a sensor signal interface and a wireless communications module.

On the output side, microcontroller 74 uses a group of motor drivers 68a, 68b, and 68c to control, respectively, carriage upper drive motor 19, carriage lower drive motor 19', and shuttle motor 14.

Microcontroller 74 can also communicate with external devices and systems via WiFi PC interface 67 and USB PC interface 69.
FIGS. 13a through 13d The schematic diagrams 13a through 13d are a recapitulation of what was represented pictorially in FIGS. 1 through 8 concerning the elements of the invention that cooperate to controllably move the coupled elements across the walls of the aquarium.

Figure 13A:
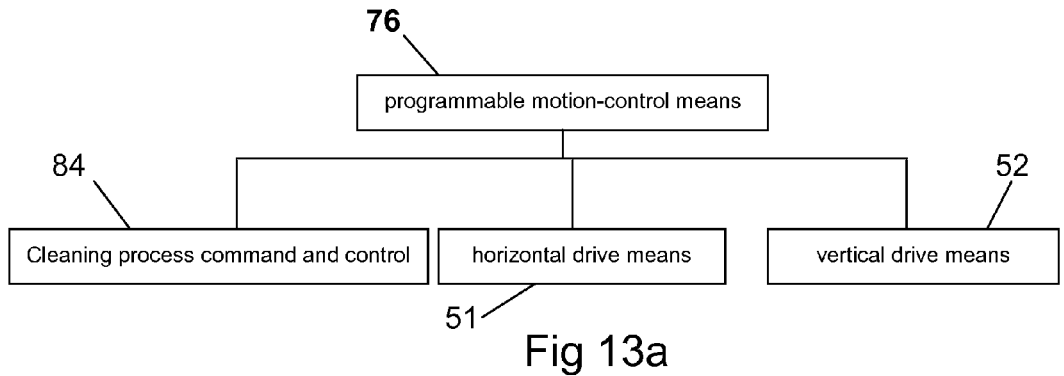
Figure 13B:
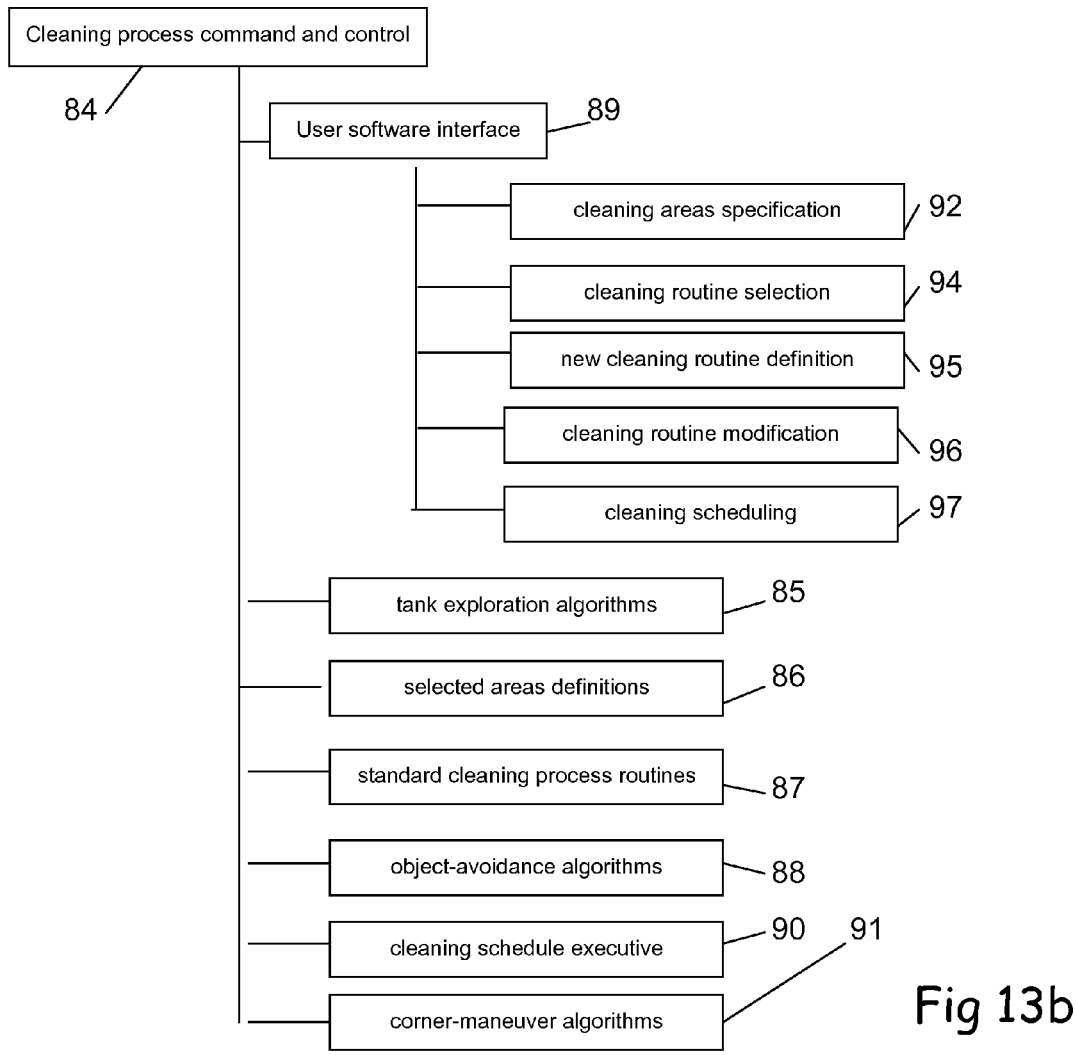
Figure 13C:
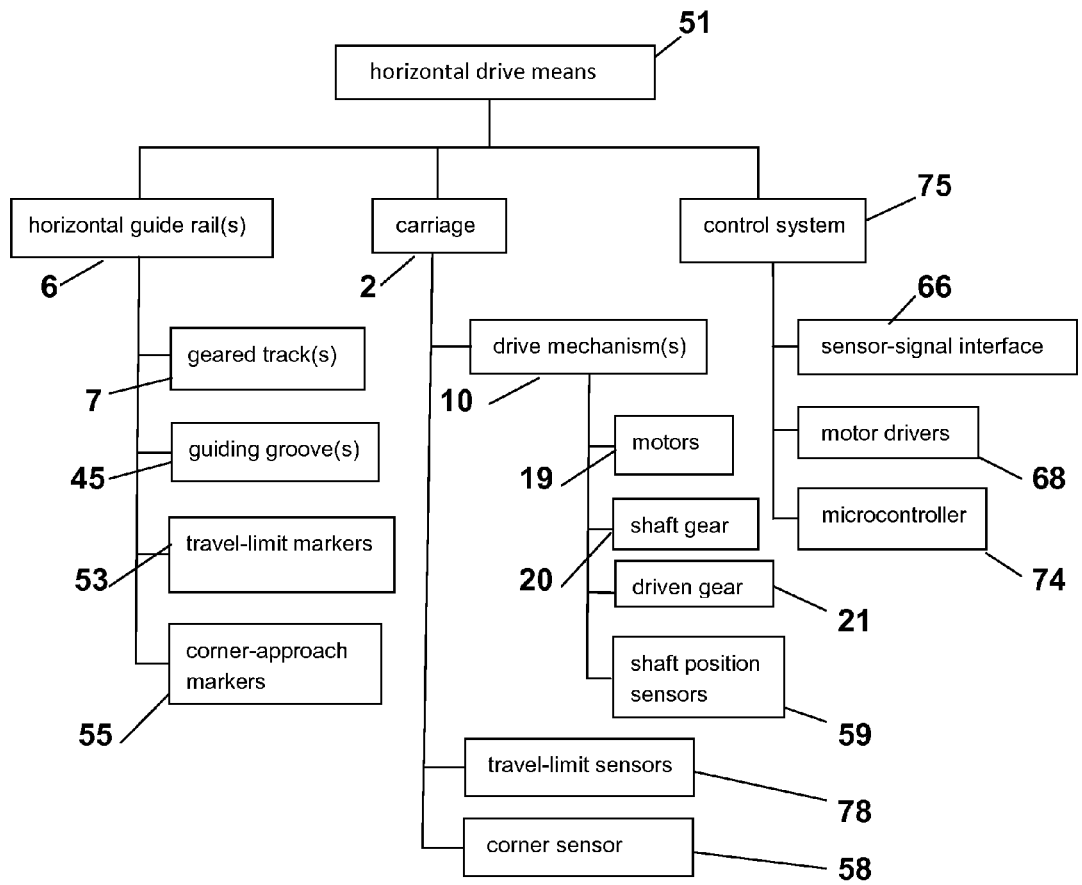
Figure 13D:
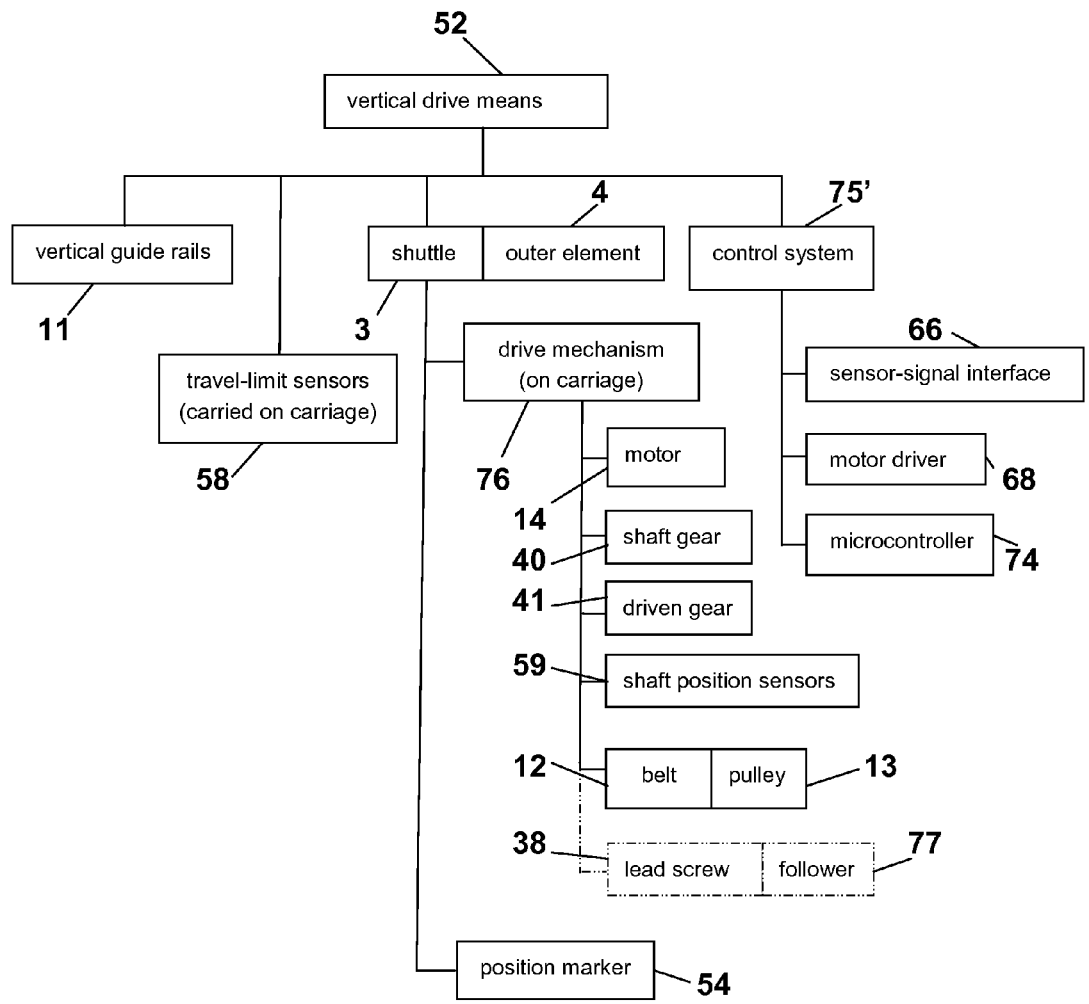

FIGS. 13c and 13d only show the elements that are employed in "normal" operations. The system components that make possible safety features and obstacle avoidance aspects of the system are not represented on those diagrams.

FIG. 13a shows schematically a programmable motion-control means 76 that comprises: a computerized cleaning process command implemented in microcontroller 74 which interfaces with the various sensors described on FIGS. 11 and 12; a horizontal drive means 51; and a vertical drive means 52.

FIG. 13b shows schematically one embodiment of the command and control system 84 which implements programmatically: a software interface to user interface 48; a set of tank exploration algorithms 85; a set of selected areas definitions 86; a set of standard cleaning process routines 87; a set of object-avoidance algorithms 88; a cleaning schedule executive system 90; and a set of corner-maneuver algorithms 91.

The user interface software shown in 13b comprises a cleaning areas specification module 92; a cleaning routine selection module 94; a new cleaning routine definition module 95; a cleaning routine modification module 96; and a cleaning scheduling module 97.

FIG. 13c illustrates schematically the components that comprise horizontal drive means 51: horizontal guide rail 6; carriage 2; and a control system 75.

Guide rails 6 comprises geared tracks 7, guiding grooves 45, travel-limit markers 53 and 53', and a pair of corner markers 55 at each corner of each rail 6.

Carriage 2 comprises: drive mechanism 10; travel-limit sensors 78; and corner sensor 58. Drive mechanism 10 comprises: motors 19; shaft gears 20; driven gears 21; and shaft position sensors 59.

Control system 75 comprises: sensor-signal interface 66; motor drivers 68; and microcontroller 74.

FIG. 13d illustrates schematically the components of vertical drive means 52, which comprises vertical guiderails 11; travel-limit sensors 78; shuttle 3 which is attached via outer element holder 32 (not shown) to outer element 4; and control system 75'.

Shuttle 3 comprises a drive mechanism 76 and position markers 54 and 54'. Drive mechanism 76 comprises: motor 14; shaft gear 40; driven gear 41; shaft position sensor 59; and, in the first preferred embodiment, belt 12 and pulley 13 as the linear-motion means. The second preferred embodiment employs, instead, lead screw 38 and follower 77 as linear-motion means.

Operation of the Preferred Embodiment

FIGS. 1, 3, 4, 5, 6, 7, 10

Installing the Tank Cleaning System of My Invention

The first step in installing the system is to prepare the upper and lower rails to precisely fit the outside perimeter of the aquarium, if they have not been provided specifically for it. As shown in FIG. 7, guide rail corner section 44 and guide rail straight section 43 interlock. In a large aquarium, there may be additional pieces of guide rail straight section 43, which will require four short joiner pieces (not shown) that can receive a guide rail straight section 43 at each end. Tools required to shorten the guide rail straight sections 43 will be provided as an accessory if required.

The upper rails are installed using the provided number of rail mounting brackets 8. The lower rail rests on the surface that supports the aquarium, and employs double-faced tape or other adhesive to firmly attach the rail to the aquarium. Geared track 7 is molded into guide rail 6, but in some embodiments it will be supplied in a continuous length that would be fitted into a groove in the assembled guide rail where it would be cemented. Battery recharging station 9 is installed using the provided mounting bracket and adhesive. Battery recharging station 9 has a connector 72 (not shown) connects to the cable of a low-voltage power supply that is plugged into an electrical outlet.

The supplied cleaning pad is installed on cleaning element mounting plate 36. If desired by the user, a cleaning pad can be installed on outer element 4 so that the outer element acts to clean the outer surface of the aquarium walls. Outer element 4 is attached to outer-element holder 32 with the bolts provided. Outer-element holder 32 is fitted into releasable retainer 26 on shuttle 3 so that outer-element holder 32 and outer element 4 are attached to the shuttle.

As shown in FIG. 1, carriage 2 is provided such that the position of carriage drive mechanism 10 and 10' are adapted to suit the height of the aquarium and the installed distance between the upper and lower rails. To install carriage 2 on guide rail 6, carriage-to-rail retainers 22 and 22' are moved apart, and then brought together after carriage 2 has been placed on guide rail 6. When carriage-to-rail retainer 22 and 22' are pivoted inward, their offset tips fit under guide rail 6 to ensure that carriage 2 cannot be accidently moved from its installed position.

Normal Use of the Cleaning System

The cleaning system 1 of this invention provides for great flexibility under user control to be able to operate under different conditions and answer different needs. The user can configure the system to suit different kinds of aquariums and different aquatic habitats and life form populations. The user follows the simple instructions provided to use user interface 48 to configure the system to suit his aquarium. The system can "explore" the walls of the aquarium to discover where fixed obstacles are installed. The user can schedule the days and times when the aquarium will be cleaned. Areas that need more thorough cleaning can be specified.

Buoyancy Adjustment

Additional buoyancy-adjusting weights 35 must be added to increase the weight of inner element 5 compared to its buoyancy if tank-cleaning system 1 of this invention is used in a salt-water aquarium, as the higher density of the salt water will increase #5's buoyancy. It is important that the center of gravity of inner element 5 be somewhat below and in exact vertical alignment with the center of buoyancy of inner element 5. What is desired is to adjust the buoyancy of inner element 5 such that when it floats freely in the aquarium it remains vertical in a stable position, with around 1 cm of inner element 5 protruding from the water. This is the same position inner element 5 will be in relative to the top of the aquarium when inner element 5 is decoupled from outer element 4. Outer element 4 will therefore be properly positioned to recapture inner element 5 when moved horizontally around the corner to a position on the second wall.

The Critical Corner-Turning Maneuver

Figure 10:
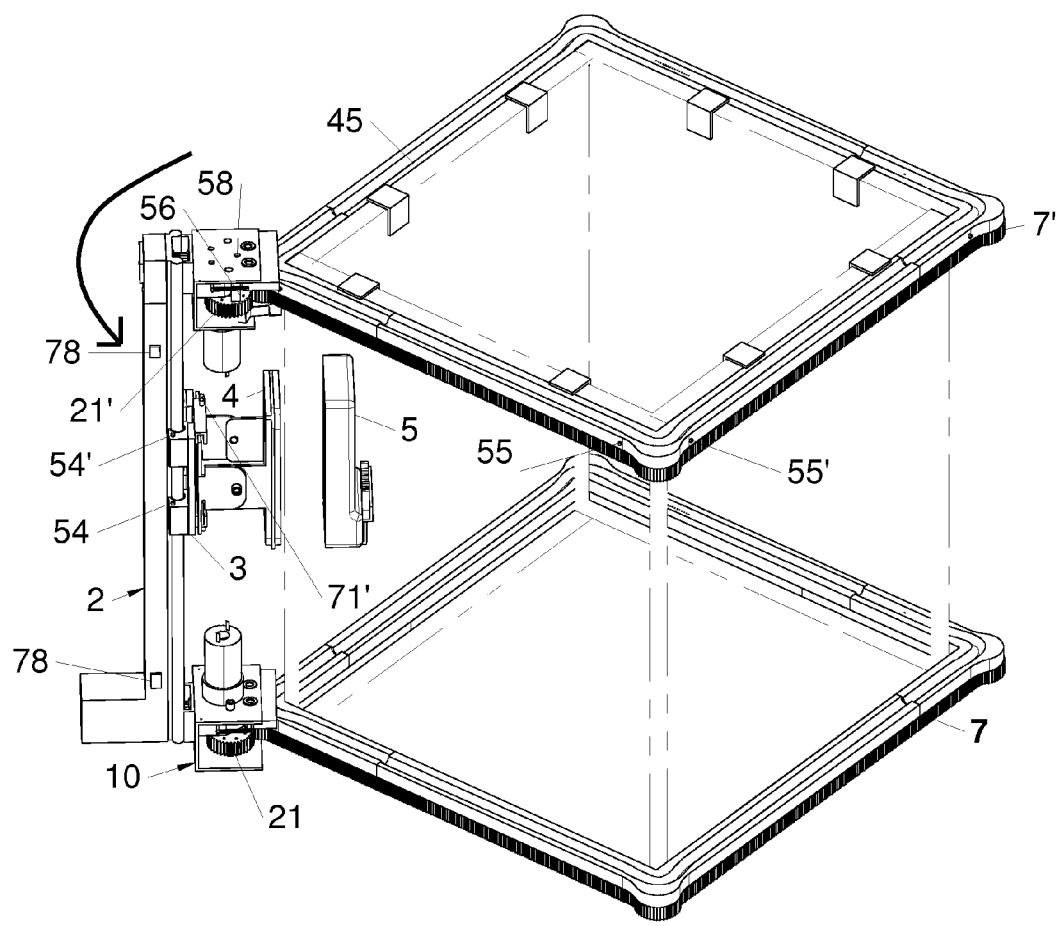
FIG. 10 is a pictorial view that shows the position of the carriage and its attached elements as the carriage moves around a corner of the aquarium.

FIG. 10 illustrates the moment during operation when carriage 2 is controlled to move rapidly along geared track 7, around the corner from a first wall after outer element 4 has decoupled from inner element 5. In FIG. 10, shuttle 3 is shown to have stopped at the top of its normal vertical path. Inner element 5 is floating freely in the aquarium, in a stable, vertical position. The position of shuttle 3 is controlled to be such that outer element 4 is positioned exactly at the same height as inner element 5 when inner element 5 is freely floating. Carriage 2 will be stopped my microcontroller 74 after carriage 2 has rounded the corner, with outer element 4 being positioned on the outer surface of the second wall. Microcontroller 74 knows the position of carriage 2 when the carriage enters a corner by means of corner magnets 46 on rail 6 which are detected by corner sensor 23 that is on drive mechanism 10. At that point, the speed of carriage 2 will be increased. When carriage 2 reaches the end of the corner, as indicated by a second magnet 46, microcontroller 74 (not shown) will halt the movement of carriage 2 and will only cause the controlled downward movement of shuttle 3 after a selected delay that permits the magnetic attraction between the corresponding pairs of coupling magnet 28 on outer element 4 and inner element 5 to have drawn inner element 5 to the second wall where it recouples with outer element 4. The carefully adjusted buoyancy of inner element 5 makes it possible for outer element 4 to recapture inner element 5 after inner element 5 has been released from being magnetically coupled to outer element 4.

The releasing of inner element 5 takes place while both outer element 4 and inner element 5 are positioned at the uppermost position of their vertical travel, and when carriage 2 is near the end of its horizontal travel along that aquarium wall. The form of the horizontal path at that point changes. It is defined by geared track 7 along which carriage-drive driven gear 21 and 21' move and the movement of groove follower 17, which is constrained to slide along guide rail groove 45. The decoupling of outer element 4 and inner element 5 is effected by gradually moving outer element 4 away from the wall along the double-ogee corner path at the same time that outer element 4 is moving on a curved path beyond the corner. The distance between the two coupling magnets 28 on inner element 4 and outer element 5 increases and they are no longer opposite each other, thereby substantially decreasing the attractive magnetic force that couples outer element 4 and inner element 5. As that happens, the continuing movement of inner element 5, now only slightly attracted to outer element 4, is prevented, as it abuts the inner corner.

After the release of inner element 5, carriage 2, along with outer element 4, is moved around the corner by carriage drive mechanism 10. The horizontal path along which the movement of carriage 2 is constrained is such that outer element 4 is brought to a position in which it is disposed against the second wall. Microcontroller 74, which recognizes the position of outer element 4 by means of corner magnet sensor 58 that detects corner marking magnet 46 that is disposed at that position along guide rail groove 45, causes outer element 4 to stop for a delay that is sufficient for the magnetic attraction between the corresponding pairs of coupling magnet 28 on outer element 4 and inner element 5 to cause inner element 5 to turn from its position facing the first wall so that it faces the second wall and is attracted by the coupling magnets 28 in outer element 4. Inner element 5 is thereby moved by the attracting force until it recouples with outer element 4 and is pressed firmly to the inner surface of the second wall.

Operation—Summary of Safety Features a) A capacitor sensor on carriage 2 can detect if anyone (including child or pet) touches the carriage while it is moving. Obstacle sensor 62 on outer element 4 can detect unexpected obstacles that element 4 bumps into.

b) In the case of a system in which only one guide rail is used, the vertical component of carriage 2 is suspended via pivot bolt 39 to carriage drive mechanism 10. If either the inner or the outer brush, or the carriage itself bumps against an unexpected obstacle, the motion of the carriage will be impeded and the carriage will be deflected from its normally vertical orientation. An angular position sensor 60 at pivot bolt 39 will detect that deflection, triggering an alarm condition that will stop the drive motors and display an alarm notice on the display screen.

c) When carriage 2 is not in its rest position, the opening of a magnetic switch (not shown) cuts the electrical supply to the contacts at the battery-charging station. The same is true for the connection between the matching contacts on the carriage and the onboard battery.

d) All motor operations will cease if microcontroller 47 detects that the configured maximum time limit for a standard operation, such as traveling a specific horizontal or vertical distance, is exceeded.

e) The carriage can only be removed from the guide rail(s) only if carriage-to-rail retainers 22 and 22' are released. This also prevents the carriage from falling off the rail(s) if it is jostled, accidently or on purpose, by a small child or a large dog.

Second Preferred Embodiment

Figure 8A:
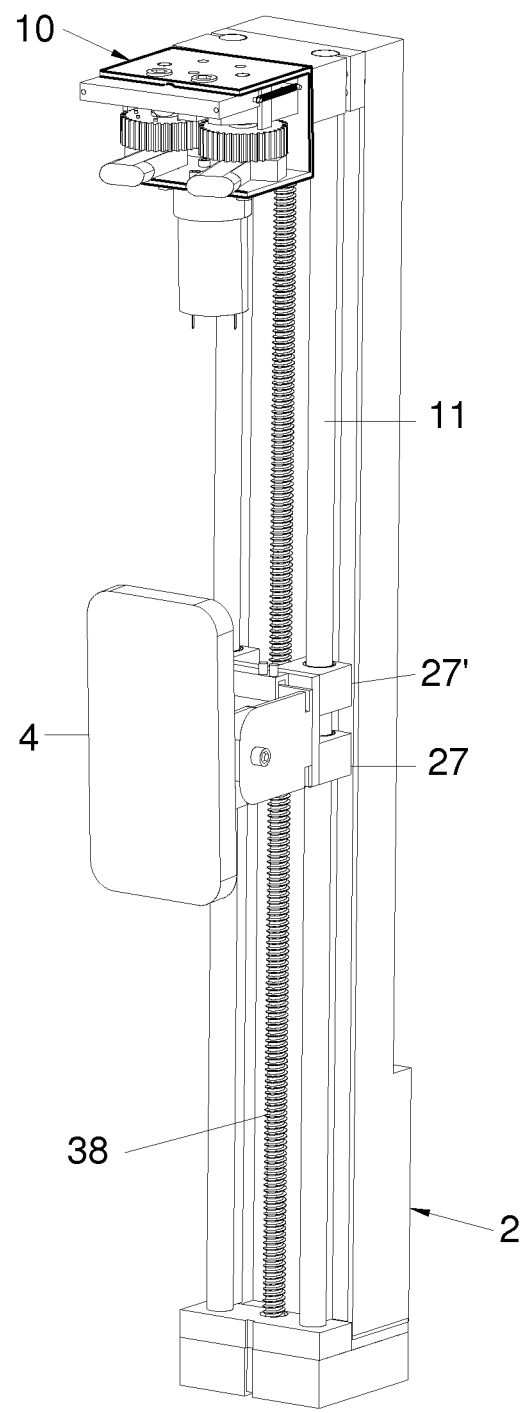
FIGS. 8a and 8b are pictorial views that show the principal moving elements of a second preferred embodiment.
Figure 8B:
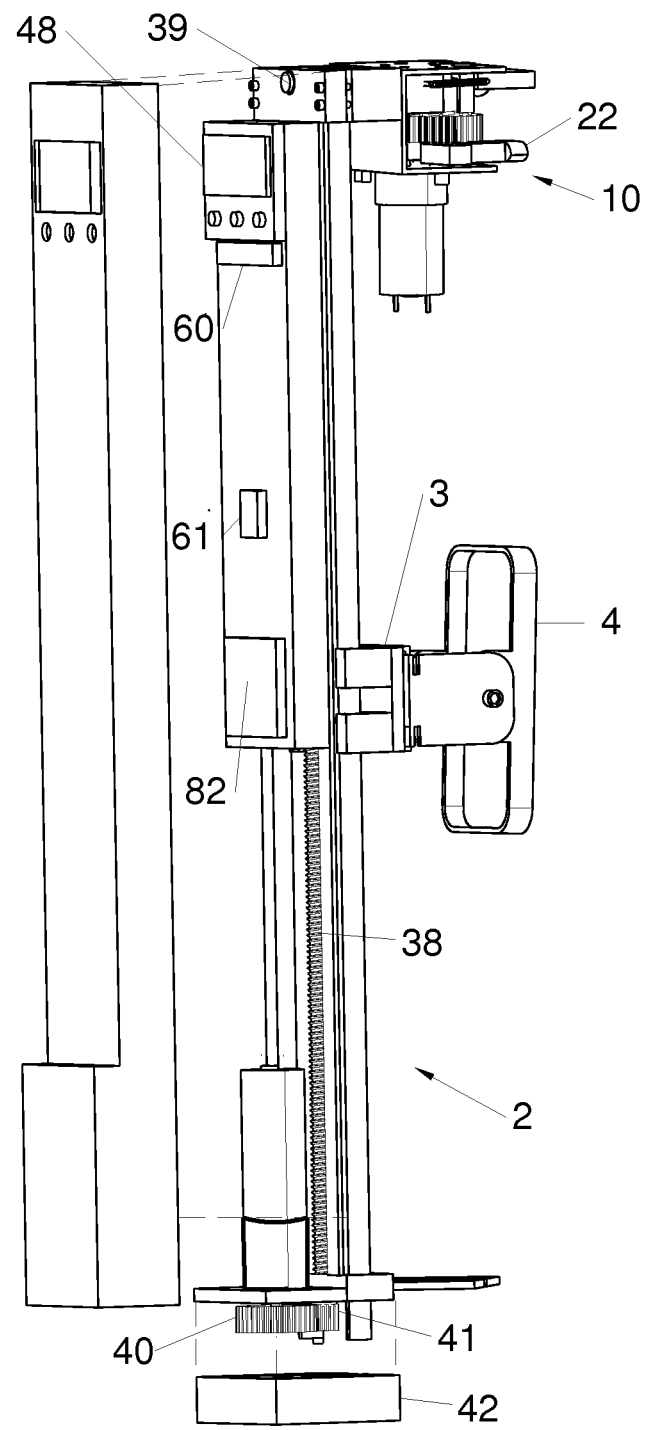
Figure 9:
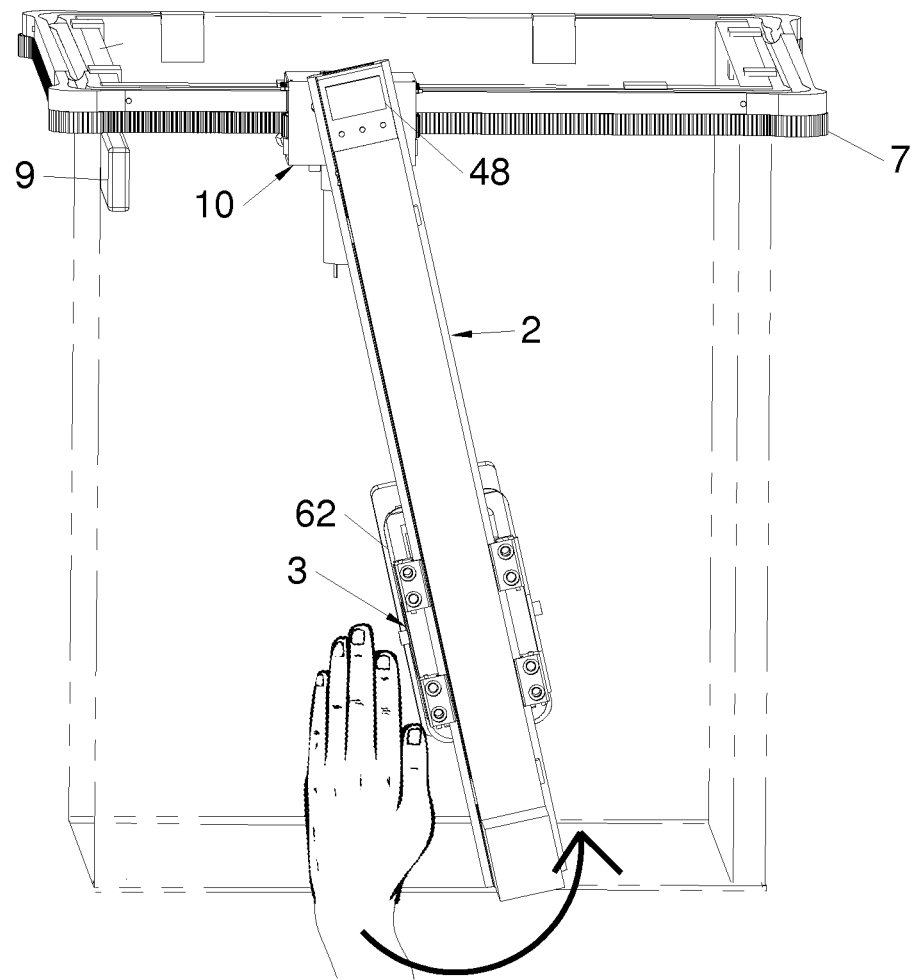
FIG. 9 is a pictorial view that shows the working of a principal safety feature of the second preferred embodiment that reacts if an obstacle is encountered during operation of the invention.

FIGS. 8a, 8b, 9

FIG. 8a is a pictorial view of an alternative embodiment of this invention, a design that is adapted for use with a single guide rail 6 which is positioned at the top of the aquarium. A single carriage drive mechanism 10 is used that engages guide rail groove 45 and geared track 7 on that rail, with carriage 2 thereby being movably attached to the rail. The vertical section of carriage 2 that is the height of the aquarium is pivotably attached to carriage drive mechanism 10 by means of a pivot bolt 39.

Although a linear-motion belt 12 could be used in such a single-rail design, FIGS. 8a and 8b illustrate the use of a lead screw 38 to provide vertical linear motion of shuttle 3. Such a linear-displacement means could also be incorporated into the first preferred embodiment instead of the linear-motion belt 12. In the embodiment shown in FIGS. 8a and 8b, shuttle 3 incorporates a compatible internally-threaded lead screw follower 77 (not shown). The lead screw could be a machined element, or alternatively it could be molded using an engineered plastic material adapted to such a purpose, such as Delrin™ from Dupont. Although this embodiment shows a single thread, to provide for more rapid movement a compound thread design may be usefully employed.

Shuttle drive motor 14 is disposed, in this embodiment, with its shaft along a vertical axis. Motor 14 drives powered gear 40 which is fixed to the shaft of shuttle drive motor 14. Powered gear 40 drives driven gear 41 which is fixed to the end of lead screw 38. At the base of carriage 2 is gear cover 42 which protects both the gears and those who approach carriage 2.

As in the case of the first preferred embodiment, integral to carriage drive mechanism 10 are a pair of battery recharging contacts 70 that make contact with matching contacts 71' in battery recharging station 9 when carriage 2 is in its park position adjacent battery recharging station 9. User interface 48, which comprises display screen and user input means, allows a user to a) configure the electronic controls to adapt the system to the aquarium it is installed on, and b) control the parameters that determine the desired cleaning pattern and schedule.

FIG. 9 illustrates the function of pivot bolt 39 in the second preferred embodiment that allows the vertical portion of carriage 2 to swing away from its normal vertical position in the event of an obstacle blocking the horizontal movement of carriage 2, of outer element 4, or of inner element 5. An angular position sensor 60 sensor (not shown), by sensing any movement of the hanging portion of carriage around the pivot point of bolt 39, will detect such an event and cause a signal to be received by microcontroller 74. Microcontroller 74 will immediately suspend the activity of the system. A user must enter a reset code via user interface 48 to reactivate the system.

SPECIFIC COMPETITIVE ADVANTAGES OF THIS INVENTION

The Rising design (U.S. Pat. No. 5,806,463, previously cited), has numerous shortcomings which have been overcome by the present invention.

In addition to that prior art not being able to clean aquarium walls near the corners, and not teaching a system that can be readily retrofitted to an existing aquarium, the inventor states that the mechanism located within the tank can be blocked by large snails and anemones. The inventor's solution for snails is to ensure that only small snails are in the aquarium. If anemones position themselves on the design's stop ledge that is positioned towards the bottom of the tank, the solution is to only activate the sweeping mechanism when such anemones "have moved to a suitable resting place that does not interfere with sweeper operation".

Rising's design defies basic mechanical principles. The cleaning assembly ("sweeper mechanism") shown is the full height of the aquarium wall. The weight of the sweeper mechanism is shown as being supported by only at a single point by a single "guide arm" that moves along a narrow groove in a toothed track that turns a corner. (A gear moves the sweeper along the track that is adjacent to the groove, with the gear a d track having teeth with a vertical face, therefore not providing any additional support.) For such movement along a groove to be possible while maintaining contact between the cog wheel and the teeth of the track, the guide arm must be in the form of a single pin with a vertical axis. With the sweeping mechanism being supported only at one point on the guide rail groove by a pin from which it hangs, the sweeping mechanism will readily swing back and forth in a plane along the tank wall. No means is shown to prevent such unwanted movement. Moreover, there is no means shown that can apply any pressure between the sweeping mechanism and the tank wall. Without such pressure, an effective cleaning process is impossible.

Having a full-height sweeper arm clearly makes it impossible for Rising's system to avoid obstacles on the aquarium wall, including both life forms on the inner surface and aquarium water treatment systems and accessories that are near the aquarium walls. For this reason, the specially-built aquarium illustrated in Rising's patent has all such systems located in the center of the aquarium. Non-swimming life forms will be swept away, or must be exiled.

Rising proposes in the text that "a secondary tooth rail and cog system may be provided to hold the sweeping arm in place adjacent the aquarium surface". No such mechanism is illustrated, and the challenges that arise from having an underwater geared mechanism and drive system are not addressed. Neither a secondary motor nor a motion transmission means from the first motor is described that would teach how to build a system that would move the bottom end of the sweeping mechanism along such a "secondary tooth rail and cog system" in an inhospitable underwater environment. Clearly, such an underwater toothed rail would have to be positioned above the level of the sand or gravel at the bottom of the aquarium, high enough so that the activities of an energetic fish will not send abrasive material onto the track. The sweeper arm can only make contact with the aquarium wall above that bottom rail, leaving a wide horizontal swath of the aquarium wall uncleaned.

In contrast, my easily attached cleaning system benefits from magnetically-coupled elements which ensure a constant, desirable pressure against the aquarium wall by the inner cleaning element. The dual, orthogonal drive systems can move inner element 5 along any path: horizontal, vertical, diagonal or curved. This makes possible both obstacle avoidance and thorough cleaning by means of repeated cleaning strokes in different directions. All areas of a multi-wall aquarium can be cleaned, including the corners.

Accordingly, the reader will recognize that the tank cleaning system of my invention, which is prepared in the form of a kit that enables the system to be easily installed on a wide variety of aquariums, has overcome the limitations of the prior art. If the outer element is fitted with a cleaning pad, the system can automatically clean both surfaces of the four walls of the most common kind of aquarium, with the quality of the work done being high enough to satisfy the most demanding consumer. Difficult-to-clean places can receive a more thorough cleaning job through a combination of varied and repeated movements of the inner element across the inner surface. The system can be programmed to do the required cleaning at the preferred time of day and at the preferred frequency of cleanings per week while avoiding fixed obstacles such as filtration systems that are inside the aquarium. The system can even clean round snails that will be constantly changing their positions. Safe operation is assured by having the control system shut the system down if something interferes with system's normal operation.

Although the description of this invention contains many specificities, these should be construed not as limiting the scope of the invention, but merely as illustrations that are provided to illustrate some preferred embodiments of the invention. Thus the scope of the invention should be determined solely by the appended claims and their legal equivalents, rather than by the examples given.

I claim:

1. A wall cleaning kit for a tank having two transparent walls that meet at a corner, wherein each wall has an inner and an outer surface, wherein selected parts of those surfaces require cleaning, the kit comprising:
   a) an inner element with one side adapted to slide along an inner surface of the tank which is thereby cleaned;
   b) an outer element with a side that is adapted to slide along an outer surface of the tank;
   c) a horizontal guide rail adapted to be attached to the tank at the top of the walls, wherein the rail passes above the selected parts and comprises a followable track that assumes the form of a double ogee curve when the track travels around the corner;
   d) a vertically disposed carriage that is movably attached to the rail, and that extends from the rail to the bottom of the tank, wherein the carriage comprises;
      i. a vertical guide rail which is attached to the carriage, and which extends from one end of the carriage to the other;
      ii. a shuttle that is slidingly attached to the vertical guide rail;
      iii. a horizontal drive means that is adapted to move the carriage along the followable track;
      iv. a vertical drive means that is adapted to move the shuttle up and down along the vertical guide rail;
   e) a programmable motion-control means that controls the horizontal drive means and the vertical drive means;
wherein;
   the inner and outer elements incorporate a plurality of magnetic components on the respective sides of each element which are adapted to slide along the respective surfaces, wherein, when the elements are positioned in pairs opposite each other on a tank wall, a magnetic component in one element is disposed opposite a magnetic component of opposite polarity in the other element of the pair such that an attractive force, which is inversely proportional to the square of the distance between the components, is established between each pair of components thereby magnetically coupling the elements together, with the inner element being pressed against the inner surface and the outer element, which is pressed against the outer surface, is separated from the inner element by a distance equal to the thickness of the wall;
   the outer element is attached to the shuttle;
   the programmable motion-control means is adapted to sequentially cause the steps of:
      i. moving the elements across the selected areas of a first wall;
      ii. moving the elements to a finishing position wherein the inner element abuts the corner and is thereby blocked from moving further horizontally;
      iii. moving the outer element along the curve of the horizontal track, around the corner, to a starting position on a second wall, whereby the attractive force has decreased as the distance between the elements has increased;
      iv. pausing until the inner element is moved by the decreased attractive force to a position that is on the second wall opposite the outer element, whereby the elements are recoupled;
      v. moving the magnetically coupled elements across the selected areas of the second wall;
   whereby the selected areas of the walls are cleaned.

2. The wall cleaning kit of claim 1 wherein the horizontal drive means comprises:
- a) a frame;
- b) two shafts;
- c) two spur gears;
- d) a motor comprising an output shaft;
- e) a pinion gear;
- f) a geared track fixed to the guide rail;
- g) a control system adapted to control the rotation of a motor;

wherein the frame is fixed to the carriage,
the motor is fixed to the frame,
the pinion gear is fixed to the output shaft,
each spur gear is mounted rotatably on one shaft,
the shafts are fixed to the frame such that the spur gears mesh with the pinion gear,
the spur gears mesh with the teeth of the geared track, and
the motor is controlled by the control system,
whereby the control system can controllably urge the carriage along the track.

3. The wall cleaning kit of claim 1 wherein the vertical drive means comprises:
- a) a frame mounted on the carriage;
- b) one shaft;
- c) two identical pulleys adapted to positively drive a belt;
- d) a motor comprising an output shaft;
- e) a belt adapted to be driven positively by a pulley that has an attachment point;
- f) a control system adapted to control the rotation of a motor;

wherein the frame is fixed to the carriage,
a first pulley is fixed rotatably on the shaft,
the second pulley is fixed to the output shaft,
the motor is fixed to the frame,
the belt surrounds the pulleys,
the shaft is fixed to the frame such that its axis is parallel to the output shaft, the faces of the pulleys lie in the same plane, the belt is stretched tightly, and the belt is parallel to and proximate to the vertical guide rail,
the shuttle is fixed to the attachment point, and
the motor is controlled by the control system,
whereby the control system can controllably urge the shuttle along the vertical guide rail.

* * * * *